United States Patent
Ochiai et al.

(10) Patent No.: US 8,485,157 B2
(45) Date of Patent: Jul. 16, 2013

(54) CONTROL SYSTEM FOR INTERNAL COMBUSTION ENGINE

(75) Inventors: Sinobu Ochiai, Wako (JP); Yasunori Ohyama, Wako (JP); Ayao Kawakami, Wako (JP); Hiroshi Koan, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 608 days.

(21) Appl. No.: 12/825,407

(22) Filed: Jun. 29, 2010

(65) Prior Publication Data

US 2011/0017171 A1    Jan. 27, 2011

(30) Foreign Application Priority Data

Jul. 22, 2009   (JP) .................. 2009-170992

(51) Int. Cl.
*F02D 41/12* (2006.01)
*F02D 9/02* (2006.01)
*B60T 7/12* (2006.01)

(52) U.S. Cl.
USPC ............................................ 123/350; 701/70

(58) Field of Classification Search
USPC .............. 123/350, 399, 361, 371, 435, 493, 123/403; 701/70, 83–85, 110
See application file for complete search history.

(56) References Cited

U.S. PATENT DOCUMENTS

| | | | |
|---|---|---|---|
| 6,315,693 B1 * | 11/2001 | Tayama | 477/46 |
| 2002/0067072 A1 | 6/2002 | Mizutani et al. | |
| 2003/0104904 A1 | 6/2003 | Ogawa et al. | |

FOREIGN PATENT DOCUMENTS

| | | | |
|---|---|---|---|
| FR | 2 828 843 A1 | | 2/2003 |
| JP | 05208666 A | * | 8/1993 |
| JP | 8-164840 A | | 6/1996 |
| JP | 2000-120474 | | 4/2000 |
| JP | 2002339769 A | | 11/2002 |
| JP | 2010223064 A | | 10/2010 |
| JP | 2011026975 A | * | 2/2011 |

OTHER PUBLICATIONS

European Search Report application No. EP 10 16 8330 dated Oct. 5, 2010.

* cited by examiner

*Primary Examiner* — Hieu T Vo

(74) *Attorney, Agent, or Firm* — Squire Sanders (US) LLP

(57) ABSTRACT

A control system for an internal combustion engine having a plurality of cylinders including first and second cylinder groups. The first and second intake systems correspond respectively to the first and second cylinder groups, and first and second throttle valves are provided respectively in the first and second intake systems. An output of the engine is reduced upon deceleration of a vehicle driven by the engine. A pressure parameter indicative of an assisting force generated by a brake booster is detected. An intake negative pressure is supplied to the brake booster from the first and second intake systems. One of the first and second throttle valves is opened to increase the engine output when the pressure parameter is equal to or less than a first threshold value which indicates that the assisting force of the brake booster has decreased.

10 Claims, 3 Drawing Sheets

CONTROL SYSTEM FOR INTERNAL COMBUSTION ENGINE

BACKGROUND OF THE INVENTION

1. Field of the Invention

The present invention relates to a control system for an internal combustion engine, and particularly to a control system for an internal combustion engine which has a plurality of cylinders consisting of two or more cylinder groups, and a plurality of intake systems respectively corresponding to the cylinder groups.

2. Description of the Related Art

The brake booster for assisting the driver in operating the brake pedal of the automobile is widely used. The brake booster uses a negative pressure (a pressure which is lower than the atmospheric pressure) generated in the intake system of the internal combustion engine, to generate the assisting force. Japanese Patent Laid-open No. 2000-120474 (JP-'474) discloses a control system for an internal combustion engine which has two cylinder groups and two intake systems corresponding to the two cylinder groups. The engine and the brake booster shown in JP-'474 are configured so that the negative pressure is supplied from the two intake systems to the brake booster.

This control system is proposed contemplating a tendency that the negative pressure in the brake booster becomes insufficient when performing the lean-burn operation of the engine. According to this control system, the partition valve provided in the passage connecting the two intake systems, is opened when the negative pressure in the brake booster is sufficient. On the other hand, when the negative pressure is insufficient, the partition valve is closed and the throttle valve in the first intake system is controlled to be slightly closed while the throttle valve in the second intake system is controlled to an opening which is suitable for the lean-burn operation. Consequently, the negative pressure is secured by the first intake system.

When the brake pedal is operated and the vehicle is decreasing, an output of the engine for driving the vehicle may sometimes be increased for securing running stability of the vehicle. When the vehicle speed is decreasing, the throttle valve is normally fully-closed to secure a sufficient negative pressure. However, if the engine output is increased upon deceleration of the vehicle as described above, the negative pressure may become insufficient. Further, when performing the shift-down of the transmission upon vehicle deceleration, the blipping control wherein the engine output is temporarily increased so as to increase the engine rotational speed, is performed. Such blipping control is also one of the factors which make the negative pressure insufficient.

The control system shown in JP-'474 is configured for securing the negative pressure when performing the lean-burn operation of the engine. Therefore, the problem due to the engine output increase control upon vehicle deceleration cannot be solved by the control system of JP-'474.

SUMMARY OF THE INVENTION

The present invention was made contemplating the above described point, and an objective of the present invention is to provide a control system for an internal combustion engine having a plurality of intake systems corresponding to two or more cylinder groups, which is able to appropriately perform the engine output increase control upon vehicle deceleration, to prevent the negative pressure for securing the assisting force of the brake booster from becoming insufficient.

To attain the above objective, the present invention provides a control system for an internal combustion engine having a plurality of cylinders including first and second cylinder groups (2A, 2B), first and second intake systems corresponding respectively to the first and second cylinder groups, and first and second throttle valves (5A, 5B) provided respectively in the first and second intake systems. The control system includes output increase control means, and pressure parameter detecting means. The output increase control means increases an output of the engine upon deceleration of a vehicle driven by the engine. The pressure parameter detecting means detects a pressure parameter (PBN) indicative of an assisting force generated by a brake booster (11) to which an intake negative pressure is supplied from the first and second intake systems. The output increase control means includes one-throttle valve control means for opening one of the first and second throttle valves (5A, 5B) to increase the engine output when the pressure parameter (PBN) is equal to or less than a first threshold value (PBN1) which indicates that the assisting force of the brake booster has decreased.

With this configuration, when performing the output increase control for increasing the engine output upon deceleration of the vehicle, the pressure parameter indicative of the assisting force generated by the brake booster is detected. The intake negative pressure is supplied to the brake booster from the first and second intake systems. If the detected pressure parameter is equal to or less than the first threshold value indicating that the assisting force of the brake booster has decreased, one of the first and second throttle valves respectively provided in the first and second intake systems is opened. Accordingly, the negative pressure is supplied to the brake booster from the intake system in which the throttle valve is not opened, thereby making it possible to secure the assisting force of the brake booster.

Preferably, the control system further includes driving wheel speed detecting means (34) for detecting a driving wheel speed (VBW) of the vehicle, and the output increase control means performs a vehicle stabilizing control in which the engine output is increased based on the driving wheel speed (VBW) upon deceleration of the vehicle.

With this configuration, the vehicle stabilizing control in which the engine output is increased based on the driving wheel speed upon deceleration of the vehicle, is performed. If the driving wheels of the vehicle are locked by the braking upon vehicle deceleration, the driving wheel speed extremely decreases. In such case, by performing the vehicle stabilizing control that the throttle valve in one of the intake systems is opened to increase the engine output, it is possible to stabilize the vehicle behavior as well as to secure the negative pressure for the brake booster.

Preferably, the vehicle includes an automatic transmission (31) connected to an output shaft of the engine, and the output increase control means further includes two-throttle valve control means for opening both of the first and second throttle valves (5A, 5B) to increase the engine output. The output increase control means uses the one-throttle valve control means when performing the vehicle stabilizing control, and selects one of the one-throttle valve control means and two-throttle valve control means according to the pressure parameter, to use the selected throttle valve control means, when performing a blipping control for increasing the engine output so as to increase an rotational speed of the engine upon shift-down of the automatic transmission (31).

With this configuration, the one-throttle valve opening control is performed when performing the vehicle stabilizing control, and one of the one-throttle valve opening control and the two-throttle valve opening control is selected according to the pressure parameter when performing the blipping control. In the two-throttle valve opening control, both of the first and second throttle valve is opened to increase the engine output. It is possible to perform a part of the output increase control with the two-throttle valve opening control, if the pressure parameter is comparatively great, i.e., the degree of shortage of the assisting force of the brake booster is small. Therefore, by applying the one-throttle valve opening control to the vehicle stabilizing control and applying the two-throttle valve opening control to the blipping control when the pressure parameter is comparatively great, the engine output can rapidly be increased when performing the shift-down of the transmission, thereby rapidly completing the shift-down.

Preferably, the output increase control means performs the vehicle stabilizing control and the blipping control using the one-throttle valve control means when the pressure parameter (PBN) is equal to or less than a second threshold value (PBN2) which is less than the first threshold value (PBN2); the output increase control means performs the vehicle stabilizing control using the one-throttle valve control means and performs the blipping control using the two-throttle valve control means, when the pressure parameter (PBN) is greater than the second threshold value (PBN2) and equal to or less than the first threshold value (PBN1); and the output increase control means performs the vehicle stabilizing control and the blipping control using the two-throttle valve control means when the pressure parameter (PBN) is greater than the first threshold value (PBN1).

With this configuration, the vehicle stabilizing control and the blipping control are performed with the one-throttle valve opening control when the pressure parameter is equal to or less than the second threshold value which is less than the first threshold value; the vehicle stabilizing control is performed with the one-throttle valve opening control and the blipping control is performed with the two-throttle valve opening control, when the pressure parameter is greater than the second threshold value and equal to or less than the first threshold value; and the vehicle stabilizing control and the blipping control are performed with the two-throttle valve opening control when the pressure parameter is greater than the first threshold value. Therefore, the engine output increase control can appropriately be performed according to the pressure parameter, i.e., the degree of shortage of the assisting force of the brake booster.

Preferably, the automatic transmission (31) includes a clutch mechanism (42) having two clutches, and the shift-change of the automatic transmission can be performed with maintaining the driving force transmission through the clutch mechanism, and the control system further includes shift-up control means for controlling the openings of the first and second throttle valves (5A, 5B) according to an engine output demanded by the driver of the vehicle.

With this configuration, the shift-up of the transmission is performed with maintaining the driving force transmission through the clutch mechanism and the openings of the first and second throttle valve are controlled according to the engine output demanded by the driver. In the vehicle having the automatic transmission including the dual clutch mechanism, the throttle valves are opened according the demand engine output of the driver upon the shill-up of the transmission. Accordingly, the pressure parameter is reduced by performing the shift-up of the transmission. Therefore, it is more advantageous to the vehicle having the dual clutch mechanism to perform the engine output increase control upon deceleration of the vehicle with the one-throttle valve opening control.

DETAILED DESCRIPTION OF THE PREFERRED EMBODIMENTS

Preferred embodiments of the present invention will now be described with reference to the drawings.

Figure 1:
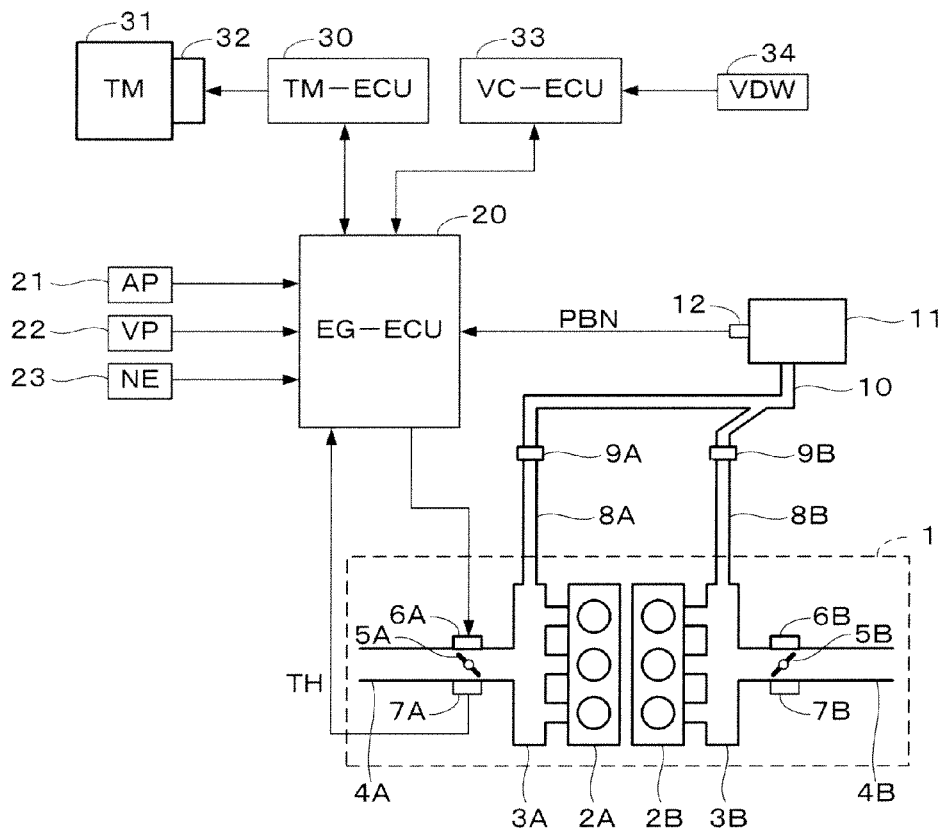
FIG. 1 shows a configuration of an internal combustion engine and a transmission mechanism for driving a vehicle according to one embodiment of the present invention and a control system therefor.

FIG. 1 shows a configuration of an internal combustion engine and a transmission mechanism for driving a vehicle according to one embodiment of the present invention and a control system therefor. A V-type six-cylinder internal combustion engine (hereinafter referred to as "engine") 1 has a first bank 2A provided with #1-#3 cylinders (first cylinder group) and a second bank 2B provided with #4-#6 cylinders (second cylinder group).

An intake system corresponding to the first bank 2A includes a first chamber 3A, a first intake passage 4A, and branch passages connecting the first chamber 3A to #1-#3 cylinders. The first intake passage 4A is provided with a first throttle valve 5A. The first throttle valve 5A is provided with a first throttle valve opening sensor 7A for detecting an opening of the throttle valve 5A, and the detection signal of the sensor 7A is supplied to an electronic control unit 20 for the engine control (hereinafter referred to as "EG-ECU"). The first throttle valve 5A is connected to a first actuator 6A for actuating the throttle valve 5A, and the operation of the first actuator 6A is controlled by the EG-ECU 20.

An intake system corresponding to the second bank 2B includes a second chamber 3B, a second intake passage 4B, and branch passages connecting the second chamber 3B to #4-#6 cylinders. The second intake passage 4B is provided with a second throttle valve 5B. The second throttle valve 5B is provided with a second throttle valve opening sensor 7B for detecting an opening of the throttle valve 5B, and the detection signal of the sensor 7B is supplied to the EG-ECU 20. The second throttle valve 5B is connected to a second actuator 6B for actuating the throttle valve 5B, and the operation of the second actuator 6B is controlled by the EG-ECU 20. In FIG. 1, the connecting lines from the EG-ECU 20 to the second actuator 6B and the second throttle valve opening sensor 7B are not shown.

The branch passages connected respectively to #1-#6 cylinders are provided with a fuel injection valve (not shown), and the fuel injection timing and fuel injection period of each fuel injection valve is controlled by the EG-ECU 20.

The first and second chambers 3A and 3B are connected via first and second connecting passages 8A and 8B, and a third connecting passage 10 to a negative pressure chamber of a brake booster 11. The first and second connecting passages 8A and 8B are respectively provided with first and second check valves 9A and 9B. The first check valve 9A opens when the pressure PBNA in the negative pressure chamber of the brake booster 11 (hereinafter referred to as "BRB absolute pressure PBNA") is higher than the intake pressure PBA1 in the first chamber 3A, to supply the negative pressure in the first chamber 3A to the negative pressure chamber of the brake booster 11. The second check valve 9B opens when the BRB absolute pressure PBNA is higher than the intake pressure PBA2 in the second chamber 3B, to supply the negative pressure in the second chamber 3B to the negative pressure chamber of the brake booster 11.

The brake booster 11 is provided with a negative pressure sensor 12 for detecting a pressure difference PBN between the pressure PBNA in the negative pressure chamber and the atmospheric pressure PA (herein after referred to as "BRB negative pressure PBN"). The detection signal of the sensor 12 is supplied to the EG-ECU 20. The BRB negative pressure PBN takes a value corresponding to the difference (PA−PBNA), and increases as the BRB absolute pressure PBNA decreases.

The brake booster 11 is configured so that the negative pressure is applied to a diaphragm according to a depressing amount of the brake pedal (not shown) of the vehicle, to increase the brake operation force.

An accelerator sensor 21 for detecting a depression amount (hereinafter referred to as "accelerator operation amount") AP of the accelerator pedal of the vehicle driven by the engine 1, a vehicle speed sensor 22 for detecting a vehicle speed VP of the vehicle, and an engine rotational speed sensor 23 for detecting an rotational speed NE of the engine 1, are connected to the EG-ECU 20. The detection signals of these sensors are supplied to the EG-ECU 20.

The EG-ECU 20 is connected to an electronic control unit 30 (hereinafter referred to as "TM-ECU 30") for controlling an automatic transmission 31 through an oil pressure control unit 32, and another electronic control unit 33 for performing the vehicle stabilizing control (hereinafter referred to as "VC-ECU 33"). The ECU's 20, 30, and 33 mutually transmit necessary data and command signals to each other.

The TM-ECU 30 transmits a signal indicative of an engine demand torque which is necessary upon the shift change of the transmission, to the EG-ECU 20. For example, when performing the shift-down, the TM-ECU 30 transmits a signal demanding the blipping control for increasing the engine output so as to temporarily increase the engine rotational speed NE, to the EG-ECU 20.

A driving wheel speed sensor 34 for detecting a driving wheel speed VDW of the vehicle is connected to the VC-ECU 33. The VC-ECU 33 transmits a signal demanding the vehicle stabilizing control for temporarily increasing the engine output.

The EG-ECU 20 includes an input circuit having various functions including shaping the waveforms of input signals from the various sensors, correcting the voltage levels of the input signals to a predetermined level, and converting analog signal values into digital signal values. The EG-ECU 20 further includes a central processing unit (hereinafter referred to as "CPU"), a memory circuit, and an output circuit. The memory circuit preliminarily stores various operating programs to be executed by the CPU and the computation results or the like by the CPU. The output circuit supplies drive signals to the actuators 6A and 6B, the fuel injection valves, and the like. The TM-ECU 30 and VC-ECU 33 are basically configured similarly to the EG-ECU 20.

The EG-ECU 20 performs an opening period control of the fuel injection valves and an ignition timing control as well as a throttle valve opening control. In the throttle valve opening control, target openings THCMDA and THCMDB is calculated according to the engine demand torque and the actuators 6A and 6B is actuated so that the detected throttle valve opening THA and THB respectively coincide with the target openings THCMDA and THCMDB. The target openings THCMDA and THCMDB are calculated according to a demand torque TRQCMD of the engine 1 and the throttle valve openings THA and THB are controlled so that the output torque of the engine 1 coincides with the demand torque TRQCMD.

The crankshaft of the engine 1 is connected to the automatic transmission 31 and the output shaft of the automatic transmission 31 drives driving wheels of the vehicle through a drivetrain mechanism (not shown).

In this embodiment, the automatic transmission 31 is a dual clutch transmission including two clutches, and hereinafter referred to as "DCT 31".

The TM-ECU 30 is connected to a shift lever switch, paddle switches, and the like, and performs the automatic shift-change control based on the accelerator pedal operation amount AP, vehicle speed VP, engine rotational speed NE, and the like, or performs the shift-change control according to the driver's instruction.

Figure 2:
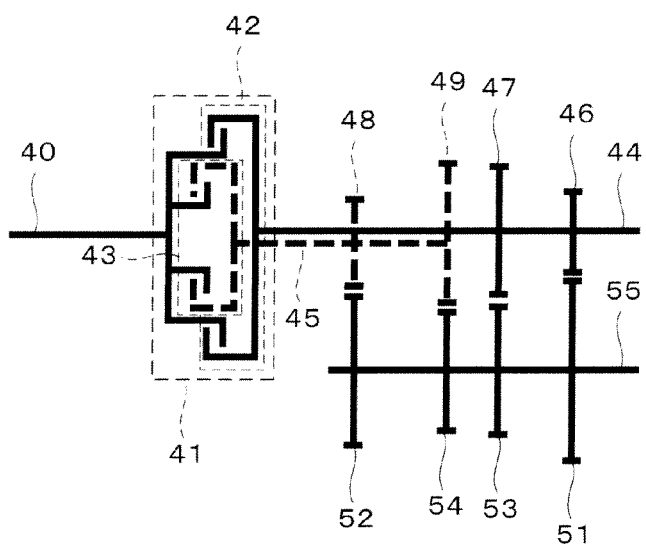
FIG. 2 illustrates a configuration of the transmission shown in FIG. 1.

FIG. 2 shows a part of simplified configuration of the DCT 31, in which 1st to 4th speed gears are shown. The crankshaft 40 of the engine 1 is connected to a clutch mechanism 41 which includes a first clutch 42 connected to a first main shaft 44, and a second clutch 43 connected to a second main shaft 45.

On the first main shaft 44, a first drive gear 46 and a third drive gear 47 are supported, and a second drive gear 48 and a fourth drive gear 49 are supported on the second main shaft 45. A first driven gear 51, a second driven gear 52, a third driven gear 53, and a fourth driven gear 54 are supported on an output shaft 55.

Engagement and disengagement of the first and second clutches 42 and 43, and the shift position change are performed the oil pressure control unit 32.

In this embodiment, the shift-down of the DCT 31 is performed in two modes. In the first shift-down mode, for example, the shift-down from 4th-speed position to 3rd-speed position is performed as follows. The second clutch 43 is disengaged (the first clutch is disengaged when 4th-speed position is selected), the mesh between the fourth drive gear 49 and the fourth driven gear 54 is released, the 3rd drive gear 47 is meshed with the third driven gear 53, and the first clutch 42 is engaged. Alternatively, the third drive gear 47 may be meshed with the third driven gear 53 before or immediately after the beginning of the shift-down, since the first clutch 42 is disengaged when the 4th-speed position is selected. In the first shift-down mode, the torque transmission through the clutch mechanism 41 is cut for a certain time period. The demand signal for the blipping control is transferred from the TM-ECU 30 to the EG-ECU 20 when the torque transmission through the clutch mechanism 41 is cut.

In the second shift-down mode, the third drive gear 47 is meshed with the third driven gear 53 before or immediately after the beginning of the shift-down when the 4th-speed position is selected, and the engaging operation in which the engaging force of the first clutch 42 is gradually increased is performed in parallel with the disengaging operation in which the engaging force of the second clutch 43 is gradually reduced. In the second shift-down mode, the shift-down can be performed with maintaining the driving force transmission through the clutch mechanism 41.

When performing the shift-up of the DCT 31 (e.g., from 3rd-speed position to 4th-speed position), the fourth drive gear 49 is meshed with the fourth driven gear 54 at the beginning of the shift-up when the 3rd-speed position is selected, and the disengaging operation in which the engaging force of the first clutch 42 is gradually reduced is performed in parallel with the engaging operation in which the engaging force of the second clutch 43 is gradually increased. Accordingly, the shift-up is performed under the condition where the throttle valves 5A and 5B are opened according to the demand torque (accelerator pedal operation amount AP) of the driver of the vehicle.

FIGS. 3A-3H and FIG. 4 are time charts for illustrating the output torque control of the engine 1 in this embodiment. FIGS. 3A-3H show an example where the shift-up is performed at times t1 and t2; the accelerator pedal is returned at time t3; the brake pedal is depressed at time t4 immediately after t3, to start a rapid deceleration which continues to time t14; and the brake pedal is returned and the accelerator pedal is depressed at time t14 to start an acceleration again. During the rapid deceleration TRDEC (t4-t14), the shift-down is performed three times (t6, t9, t12), and the shift-up is performed at times t15 and t16 after the start of the acceleration.

Figure 3:
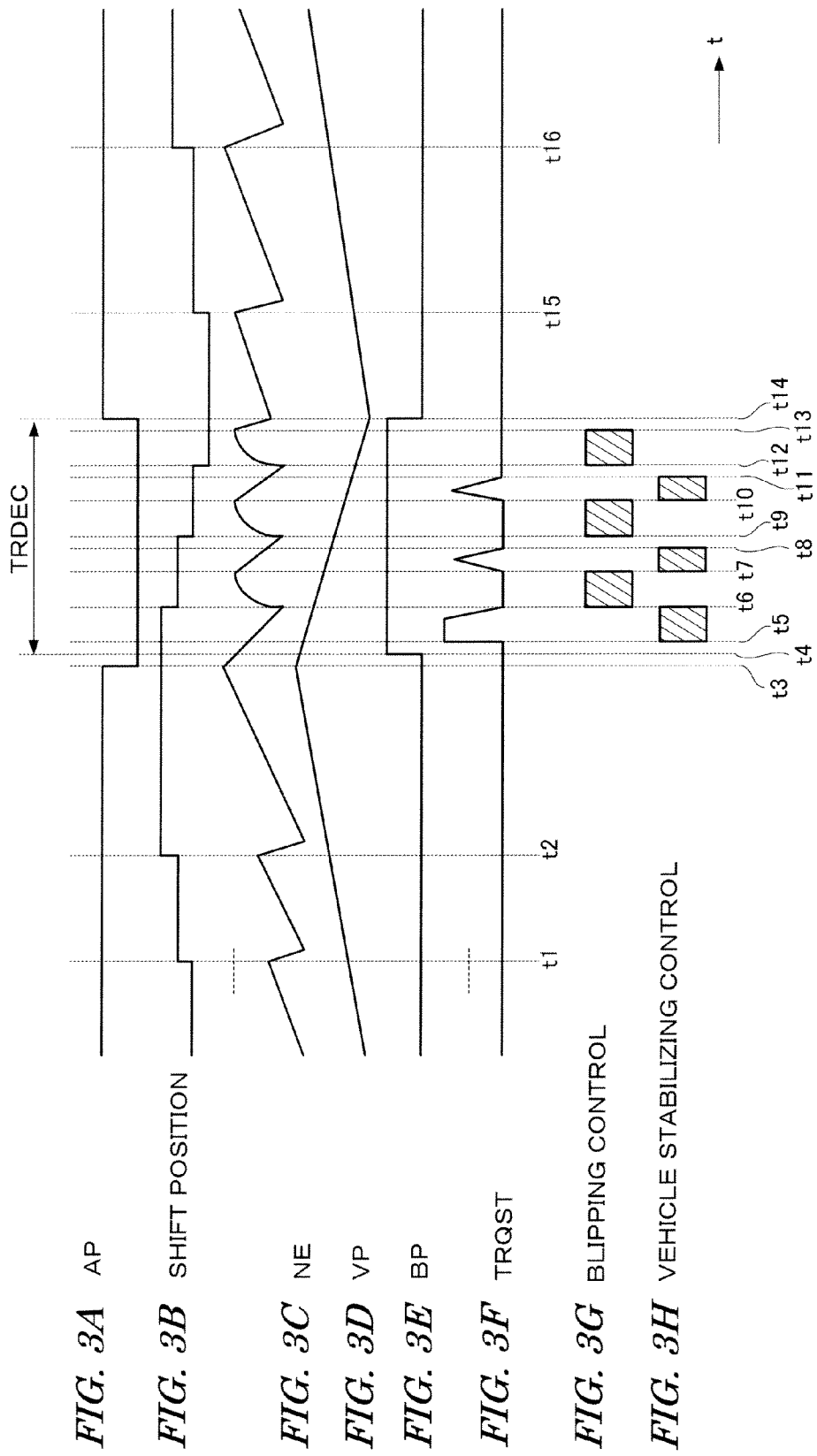
FIG. 3A to 3H show time charts for illustrating a control upon deceleration of the vehicle.
Figure 4:
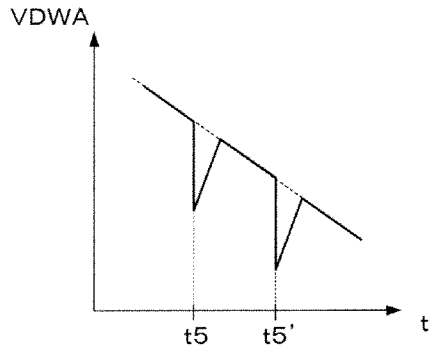
FIG. 4 is a time chart for illustrating a vehicle stabilizing control.

FIG. 4 showy changes in the average value VDWA of the driving wheel speeds of the right and left driving wheels of the vehicle (VDWA will be hereinafter referred to simply as "driving wheel speed"). Specifically, in the example of FIG. 4, the driving wheel speed VDWA rapidly decreases and immediately returns to the original state (shown by the dotted line). In this embodiment, when the driving wheel speed VDWA rapidly decreases, the stabilization demand torque TRQST is transferred from the VS-ECU 33 to the EG-ECU 20 as shown in FIG. 3F, to perform the vehicle stabilizing control in which the engine output torque is increased. According to the vehicle stabilizing control, the driving wheel speed VDWA returns to the original state immediately after the rapid decrease. It is to be noted that the vehicle stabilizing control is restarted if the rapid decrease in the driving wheel speed VDWA occurs again (time t5' in FIG. 4).

In the example shown in FIGS. 3A-3H, the vehicle stabilizing control is performed during the periods of t5-t6, t7-t8, and t10-t11.

Further, as shown in FIG. 3G, the blipping control is performed during the periods of t6-t7, t9-t10, and t12-t13, wherein the engine output torque is temporarily increased.

Upon deceleration of the vehicle, the throttle valves 5A and 5B are normally fully closed and the negative pressure is consequently supplied from the intake passages 4A and 4B to the brake booster 11. When performing the blipping control or the vehicle stabilizing control, the throttle valves 5A and 5B are opened. During the rapid deceleration period TRDEC, the brake pedal is strongly depressed, which reduces the negative pressure in the brake booster 11, and the supply of negative pressure is not sufficient due to the opening operation of the throttle valves 5A and 5B. Accordingly, shortage of the brake operation assisting force of the brake booster 11 may be caused.

Further, in this embodiment, the opening state of the throttle valves 5A and 5B is maintained upon the shift-up of the transmission, which is also one of the factors causing shortage of the negative pressure in the brake booster 11.

Figure 5:
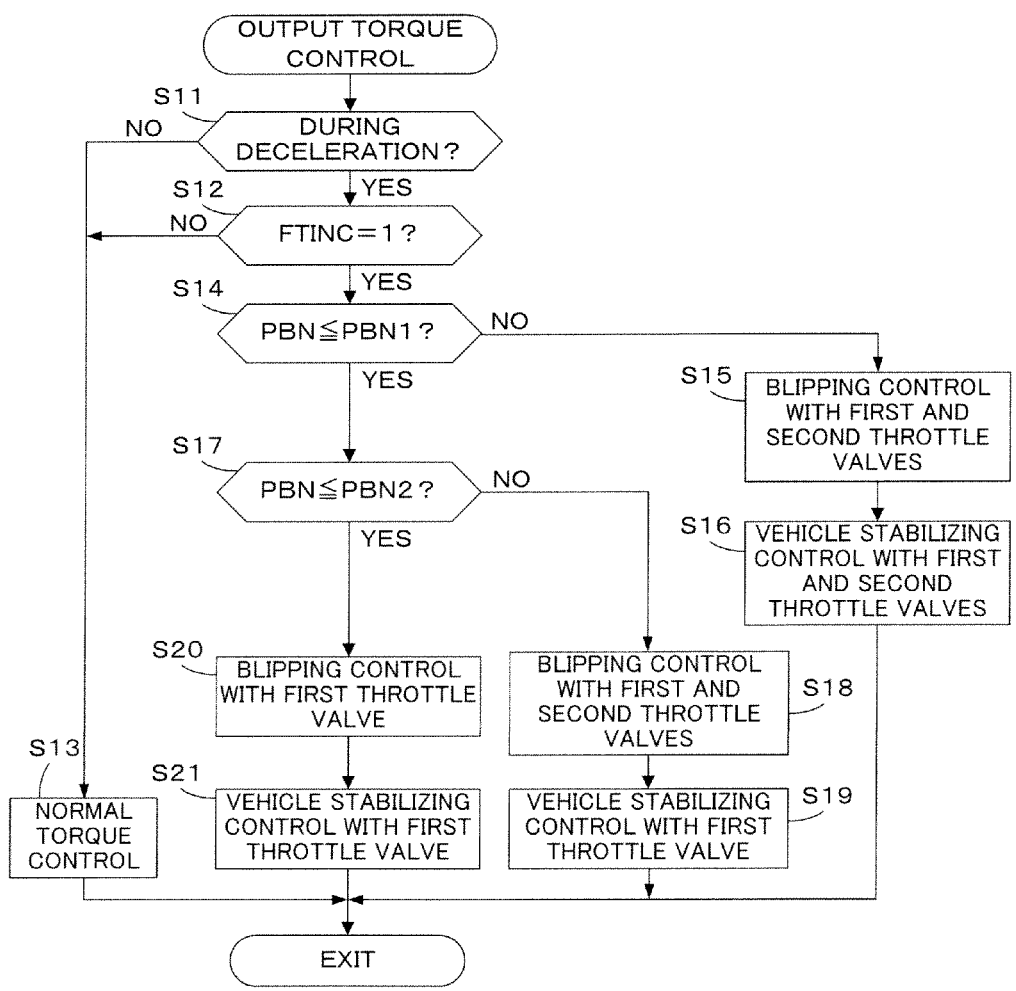
FIG. 5 is a flowchart of a process for performing an output torque control of the internal combustion engine.

Therefore, in this embodiment, the output torque control of the engine 1 is performed with the process shown in FIG. 5, to ensure the negative pressure in the brake booster 11. The process shown in FIG. 5 is executed at predetermined time intervals by the CPU in the EG-ECU 20.

In step S11, it is determined whether or not the vehicle is during deceleration. If the answer to step S11 is negative (NO), the normal output torque control is performed (step S13). If the answer to step S11 is affirmative (YES), it is determined whether or not a torque increase flag FTINC is "1" (step S14). The torque increase flag is set to "1" when the request for the blipping control or the vehicle stability control is received. If the torque increase flag FTINC is "0", the process proceeds to step S13.

If the torque increase flag FTINC is "1", it is determined whether or not the BRB negative pressure PBN is equal to or less than a first threshold value PBN1 (e.g., 65 kPa) (step S14). If the answer to step S14 is negative (NO), the negative pressure in the brake booster is determined to be sufficient, and the blipping control or the vehicle stabilizing control is performed by opening both of the first and second throttle valves 5A and 5B (steps S15 and S16). Requested one of the blipping control and the vehicle stabilizing control is performed although steps S15 and S16 are shown in series in FIG. 5.

If the answer to step S14 is affirmative (YES), i.e., the BRB negative pressure PBN is equal to or less than the first threshold value PBN1, it is further determined whether or not the BRB negative pressure is equal to or less than a second threshold value PMN2 (e.g. 50 kPa) which is less than the fist threshold value PBN1 (step S17).

If the answer to step S17 is negative (NO), i.e., the BRB negative pressure PBN is greater than the second threshold value PBN2 and equal to or less than the first threshold value PBN1, the blipping control is performed by opening both of the first and second throttle valves 5A and 5B, or the vehicle stabilizing control is performed by opening only the first throttle valve 5A (steps S18 and S19). Requested one of the blipping control and the vehicle stabilizing control is performed although steps S18 and S19 are shown in series in FIG. 5.

If the answer to step S17 is affirmative (YES), i.e., the BRB negative pressure PBN is equal to or less than the second threshold value PBN2, the blipping control or the vehicle stabilizing control is performed by opening only the first throttle valve 5A (steps S20 and S21). Requested one of the blipping control and the vehicle stabilizing control is performed although steps S20 and S21 are shown in series in FIG. 5.

Both of the blipping control and the vehicle stabilizing control may possibly be requested. In such case, the control with a greater demand torque is selected to be performed in this embodiment.

According to the process of FIG. 5, when performing the torque increase control in which the engine output is increased upon vehicle deceleration, the vehicle stabilizing control is performed by opening only the first throttle valve 5A if the BRB negative pressure is equal to or less than the first threshold value PBN1 indicating that the assisting force of the brake booster has decreased. Consequently, the second throttle valve 5B is maintained at the closed state, and the negative pressure is supplied from the second intake system to the brake booster 11, to ensure sufficient assisting force of the brake booster 11.

Further, 1) the vehicle stabilizing control and the blipping control are performed by opening only the first throttle valve 5A if the BRB negative pressure PBN is equal to or less than the second threshold value; 2) the vehicle stabilizing control is performed by opening only the first throttle valve 5A and the blipping control is performed by opening the first and second throttle valves 5A and 5B if the BRB negative pressure is greater than the second threshold value PBN2 and equal to or less than the first threshold value PBN1; and 3) the vehicle stabilizing control and the blipping control are performed by opening the first and second throttle valves 5A and 5B if the BRB negative pressure PBN is greater than the first threshold value PBN1.

Accordingly, the output torque increase control can appropriately be performed according to a degree of shortage of the BRB negative pressure PBN, i.e., the assisting force of the brake booster 11. If the BRB negative pressure PBN is comparatively great (PBN is equal to or greater than PBN2), i.e., the degree of shortage of the assisting force of the brake booster 11 is comparatively small, by performing the blipping control by opening the two throttle valves, the engine output torque can rapidly be increased upon shift-down of the transmission, thereby rapidly completing the shift-down.

Further, in this embodiment, the shift-up of the transmission is performed with maintaining the driving force transmission through the clutch mechanism 41 and the openings of the first and second throttle valve are controlled according to the demand output of the driver (accelerator pedal operation amount AP). In the DCT 31 including the clutch mechanism 41, the throttle valves 5A and 5B are opened upon the shift-up of the transmission. Accordingly, the BRB negative pressure PBN may possibly be reduced by performing the shift-up of the transmission. Therefore, it is more advantageous to the vehicle having the dual clutch mechanism to appropriately perform the engine output increase control upon vehicle deceleration by opening only the first throttle valve 5A.

In this embodiment, the negative pressure sensor 12 corresponds to the pressure parameter detecting means, and the driving wheel speed sensor 34 is corresponds to the driving wheel speed detecting means. The first actuator 6A constitutes a part of the one-throttle vale control means and a part of the two-throttle valve control means, and the second actuator 6B constitutes a part of the two-throttle valve control means. The EG-ECU 20 constitutes the output increase control means, a part of the one-throttle valve control means, a part of the two-throttle valve control means, and the shift-up control means. Specifically, steps S14 to S21 correspond to the output increase control means, steps S19 to S21 correspond to the one-throttle valve control means, and steps S15, S16, and S18 correspond to the two-throttle valve control means.

The present invention is not limited to the above-described embodiment, and various modifications may be made. For example, in the above-described embodiment, the control system which performs the blipping control and the vehicle stabilizing control as the engine output torque increase control upon vehicle deceleration, is shown. The present invention is applicable to the control system which performs only one of the blipping control and the vehicle stabilizing control.

Further, the second throttle valve 5B may be opened instead of the first throttle valve 5A when opening only one throttle valve.

Further, a BRB absolute pressure PBNA which is an absolute pressure in the negative pressure chamber of the brake booster, may be detected, and a pressure difference (PA0−PBNA) between a reference atmospheric pressure PA0 (e.g., 1 atm (101.3 kPa)) and the BRB absolute pressure PBNA may be used as the pressure parameter indicative of the assisting force of the brake booster.

Further, in the above-described embodiment, the DCT 31 is shown as the automatic transmission. The inventions recited in claims 1 to 4 may be applicable to a control system for an internal combustion engine for driving a vehicle having an Automated Manual Transmission with single clutch, or an automatic transmission with a torque converter.

Further, the present invention is applicable to a control system for an internal combustion engine having a plurality of intake systems (throttle valves) which are mutually independent of others, in addition to the V-type 6-cylinder internal combustion engine described above.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having a plurality of cylinders including first and second cylinder groups, first and second intake systems corresponding respectively to said first and second cylinder groups, and first and second throttle valves provided respectively in said first and second intake systems, said control system comprising:

output increase control means for increasing an output of said engine upon deceleration of a vehicle driven by said engine; and pressure parameter detecting means for detecting a pressure parameter indicative of an assisting force generated by a brake booster to which an intake negative pressure is supplied from said first and second intake systems;

wherein said output increase control means includes one-throttle valve control means for opening one of said first and second throttle valves to increase the engine output when the pressure parameter is equal to or less than a first threshold value which indicates that the assisting force of said brake booster has decreased.

2. A control system according to claim 1, further including driving wheel speed detecting means for detecting a driving wheel speed of said vehicle, wherein said output increase control means performs a vehicle stabilizing control in which the engine output is increased based on the driving wheel speed upon deceleration of said vehicle.

3. A control system according to claim 2, wherein said vehicle includes an automatic transmission connected to an output shaft of said engine, and said output increase control means further includes two-throttle valve control means for opening both of said first and second throttle valves to increase the engine output, wherein said output increase control means uses said one-throttle valve control means when performing the vehicle stabilizing control, and selects one of said one-throttle valve control means and two-throttle valve control means according to the pressure parameter, to use the selected throttle valve control means, when performing a blipping control upon shift-down of said automatic transmission, the engine output being increased for increasing an rotational speed of said engine in the blipping control.

4. A control system according to claim 3, wherein said output increase control means performs the vehicle stabilizing control and the blipping control using said one-throttle valve control means when the pressure parameter is equal to or less than a second threshold value which is less than the first threshold value;

said output increase control means performs the vehicle stabilizing control using said one-throttle valve control means and performs the blipping control using said two-throttle valve control means, when the pressure parameter is greater than the second threshold value and equal to or less than the first threshold value; and said output increase control means performs the vehicle stabilizing control and the blipping control using said two-throttle valve control means when the pressure parameter is greater than the first threshold value.

5. A control system according to claim 1, wherein said vehicle includes an automatic transmission connected to an output shaft of said engine, and said automatic transmission includes a clutch mechanism having two clutches,
   wherein the shift-change of said automatic transmission can be performed with maintaining the driving force transmission through said clutch mechanism, and
   said control system further includes shift-up control means for controlling the openings of said first and second throttles valves according to an engine output demanded by the driver of said vehicle.

6. A control method for an internal combustion engine having a plurality of cylinders including first and second cylinder groups, first and second intake systems corresponding respectively to said first and second cylinder groups, and first and second throttle valves provided respectively in said first and second intake systems, said control method comprising the steps of:
   a) increasing an output of said engine upon deceleration of a vehicle driven by said engine; and
   b) detecting a pressure parameter indicative of an assisting force generated by a brake booster to which an intake negative pressure is supplied from said first and second intake systems;
   wherein said step a) includes the step of c) opening one of said first and second throttle valves to increase the engine output when the pressure parameter is equal to or less than a first threshold value which indicates that the assisting force of said brake booster has decreased.

7. A control method according to claim 6, further including the step of d) detecting a driving wheel speed of said vehicle,
   wherein a vehicle stabilizing control is performed by said step a), the engine output being increased based on the driving wheel speed upon deceleration of said vehicle in the vehicle stabilizing control.

8. A control method according to claim 7, wherein said vehicle includes an automatic transmission connected to an output shaft of said engine, and said step a) further includes the step of e) opening both of said first and second throttle valves to increase the engine output,
   wherein said step c) is used when performing the vehicle stabilizing control, and one of said steps c) and e) is selected according to the pressure parameter, and the selected step is used when performing a blipping control upon shift-down of said automatic transmission, the engine output being increased for increasing an rotational speed of said engine in the blipping control.

9. A control method according to claim 8, wherein the vehicle stabilizing control and the blipping control are performed using said step c) when the pressure parameter is equal to or less than a second threshold value which is less than the first threshold value;
   the vehicle stabilizing control is performed using said step c) and the blipping control is performed using said step e), when the pressure parameter is greater than the second threshold value and equal to or less than the first threshold value; and
   the vehicle stabilizing control and the blipping control are performed using said step e) when the pressure parameter is greater than the first threshold value.

10. A control method according to claim 6, wherein said vehicle includes an automatic transmission connected to an output shaft of said engine, and said automatic transmission includes a clutch mechanism having two clutches,
    wherein the shift-change of said automatic transmission can be performed with maintaining the driving force transmission through said clutch mechanism, and
    said control method further includes the step of f) controlling the openings of said first and second throttles valves according to an engine output demanded by the driver of said vehicle.

\* \* \* \* \*